Figure 1:
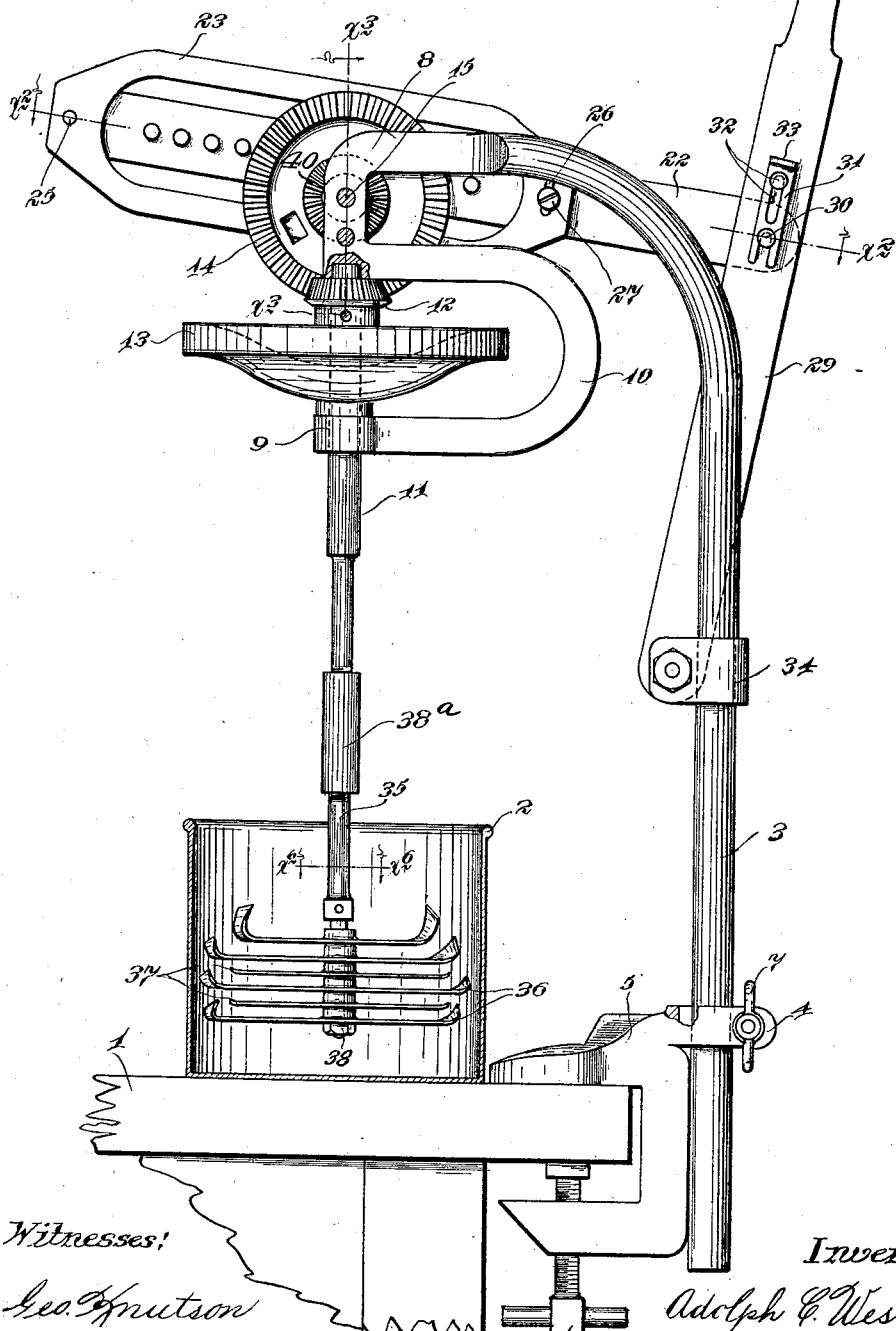

A. C. WESTBY.
BEATING AND MIXING MACHINE.
APPLICATION FILED OCT. 30, 1911.

1,074,397.

Patented Sept. 30, 1913.

2 SHEETS—SHEET 1.

Witnesses:
Geo. Knutson
E. C. Skinkle

Inventor:
Adolph C. Westby
By his Attorneys
Williamson Merchant

A. C. WESTBY.
BEATING AND MIXING MACHINE.
APPLICATION FILED OCT. 30, 1911.
1,074,397.
Patented Sept. 30, 1913.
2 SHEETS—SHEET 2.
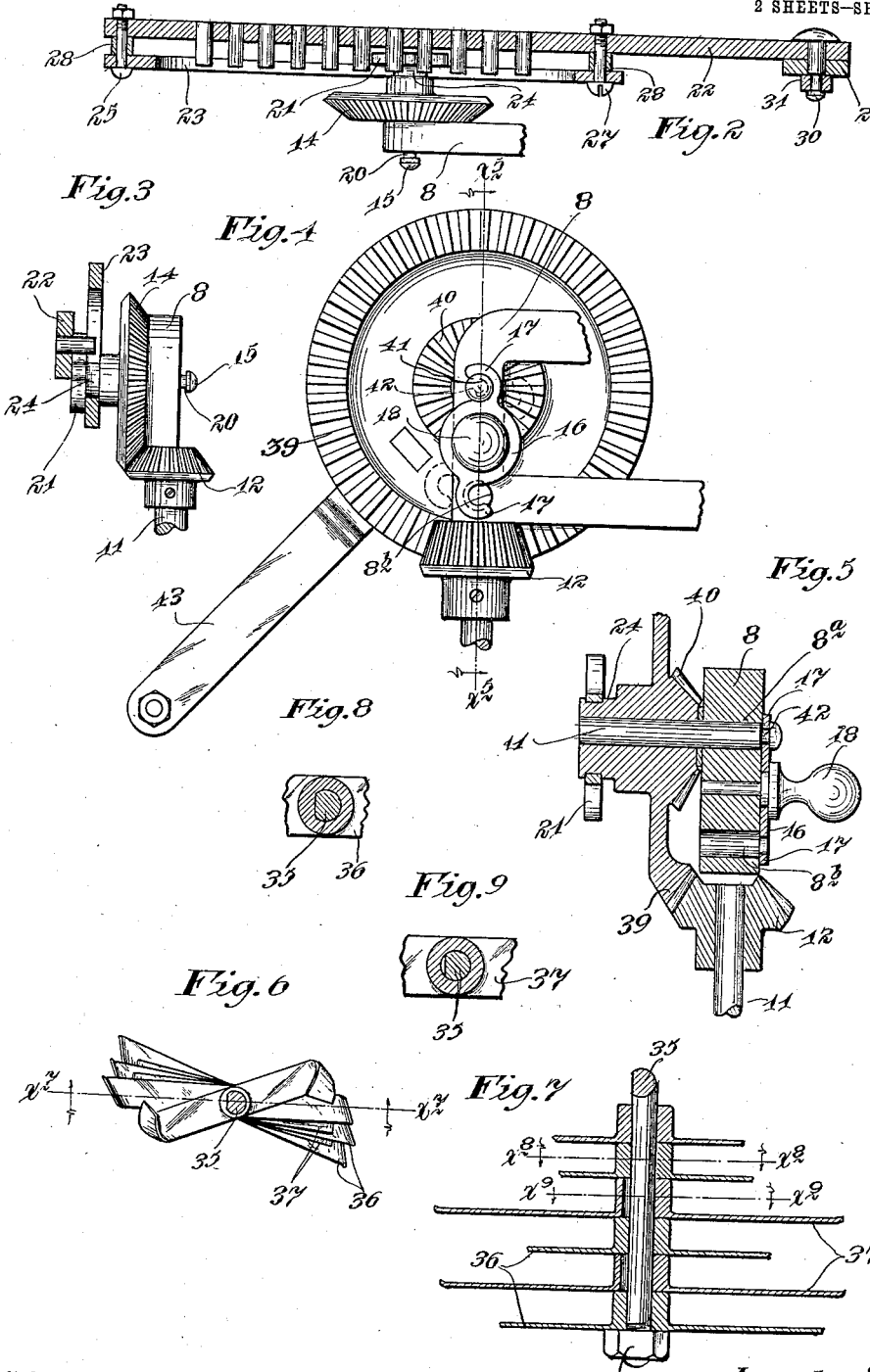

ated Sept. 30, 1913.

UNITED STATES PATENT OFFICE.

ADOLPH C. WESTBY, OF PORTER, MINNESOTA.

BEATING AND MIXING MACHINE.

1,074,397.  Specification of Letters Patent.  Patented Sept. 30, 1913.

Application filed October 30, 1911.   Serial No. 657,645.

*To all whom it may concern:*

Be it known that I, ADOLPH C. WESTBY, a citizen of the United States, residing at Porter, in the county of Yellow Medicine and State of Minnesota, have invented certain new and useful Improvements in Beating and Mixing Machines; and I do hereby declare the following to be a full, clear, and exact description of the invention, such as will enable others skilled in the art to which it appertains to make and use the same.

My invention has for its object to provide an improved beating and mixing machine especially adapted for use in beating eggs, whipping cream, mixing batter, and the like, and is adapted to operate interchangeable agitators, and is also provided with interchangeable driving devices whereby the different agitators may be driven at different speeds to meet various requirements.

To the above ends, the invention consists of the novel devices and combinations of devices hereinafter described and defined in the claims.

In the accompanying drawings, which illustrate the invention, like characters indicate like parts throughout the several views.

Referring to the drawings—Figure 1 is a view in front elevation showing the improved device secured to a portion of a table top and with the agitator projecting into a receptacle, and which receptacle is indicated in central vertical section; Fig. 2 is a view principally in horizontal section taken on the line $x^2$ $x^2$ of Fig. 1, with some parts shown in full and with other parts broken away; Fig. 3 is a detail view partly in vertical section taken on the line $x^3$ $x^3$ of Fig. 1, and with some parts shown in full; Fig. 4 is a side elevation showing a different form of driving means than that illustrated in Fig. 1, said driving means being secured in working position to a portion of the supporting bracket; Fig. 5 is a vertical section taken on the line $x^5$ $x^5$ of Fig. 4; Fig. 6 is a plan view of the agitator as shown in Fig. 1, with some parts thereof sectioned on the line $x^6$ $x^6$ of Fig. 1; Fig. 7 is a view principally in vertical section taken on the line $x^7$ $x^7$ of Fig. 6, the driving shaft being shown in full; Fig. 8 is a transverse section taken on the line $x^8$ $x^8$ of Fig. 7; and Fig. 9 is a transverse section taken on the line $x^9$ $x^9$ of Fig. 7.

For the purpose of illustrating the improved device in working position, a portion of a table top 1 has been shown in Fig. 1, and upon the top thereof is placed a receptacle 2 into which the agitator of the improved device projects.

Referring in detail to the improved device, the numeral 3 indicates an upright supporting bar which, as shown, is preferably made round in cross section. The lower end of this bar 3 is mounted for vertical and rotary adjustments in a split bearing lug 4 integrally formed on a clamp 5 comprising a pair of vertically spaced jaws arranged to embrace the edge of the table top 1. The upper of said jaws is frictionally clamped onto the table top 1 by means of a thumb screw 6 working with screw threading engagement through the lower of said jaws. The split bearing lug 4 is frictionally clamped onto the supporting bar 3 by means of a thumb screw 7 passed through the outer projecting portions of said lug.

At its upper end, the supporting bar 3 is bent laterally so as to project over the table top 1, as shown in Fig. 1. The bent free end of the supporting bar 3 terminates in a depending bearing 8 having formed therein vertically spaced and horizontally extended seats $8^a$ and $8^b$ for supporting the different driving devices. Spaced below the bearing 8 and vertically alined therewith, is a bearing 9 connected to the bearing 8 by means of a yoke 10. Rotatively mounted in the bearings 8 and 10, is a depending driving shaft 11 having secured thereto, within the yoke 10, a pinion 12 and a balance wheel 13. Meshing with the pinion 12, is a gear 14 provided with a short trunnion 15 rotatively mounted in the seat $8^a$ of the bearing 8. The trunnion 15 is detachably held in the seat $8^a$ by means of a lever 16 terminating at its ends in oppositely extended and oppositely formed hooks 17. This lever 16 is intermediately pivoted to the bearing 8 and the pivot 18 is centrally located between the seats $8^a$ and $8^b$. The hooked ends 17 of the lever 16 are adapted to be moved into and out of engagement with an annular groove 20 formed in the projecting end of the trunnion 15. To remove the gear 14 from the bearing 8, it is only necessary to move the lever 16 out of engagement with the trunnion 15 and then to remove the said trunnion endwise from the seat $8^a$.

Rigidly secured on the outer end of the hub portion of the gear 14, is a star wheel 21 which meshes with a pin tooth rack 22 and is held in mesh therewith by means of an endless guide plate 23. The inner edge portion of this guide plate 23 works within an annular groove 24 formed in the hub of the gear 14 adjacent to the star wheel 21. At its outer end, the guide plate 23 is pivotally attached to the pin tooth rack 22 by means of a pivot 25. And its inner end is adjustably secured to the pin tooth rack 22 by means of a slot 26 formed in the guide plate 23 and a nutted bolt 27 which is passed through the said slot and said pin tooth rack 22. The guide plate 23 is spaced inward and laterally from the pin tooth rack 22 by means of a pair of thimbles 28 through which the pivot 25 and nutted bolt 27 are passed. The inner end of the pin tooth rack 22 is pivotally attached to the intermediate portion of a vertically extended oscillating lever 29 by means of a headed stud 30 secured to the pin tooth rack 22 and projecting through a seat in the lever 29. For securing the headed stud 30 against removal from its seat in the lever 29, a bifurcated lock plate 31 is provided. This lock plate 31 is secured to the lever 29 for sliding movement by means of a slot and pin connection 32. The prongs of the bifurcated lock plate 31 are adapted to embrace the stud 30 below its head as shown in Fig. 1. The lock plate 31 is provided with a finger piece 33 by which the lock plate 31 may be slid on the lever 29 for moving its prongs into and out of engagement with the headed stud 30, at will. The lower end of the lever 29 is pivotally attached to a bearing 34 secured to the intermediate portion of the supporting bar 3. When the lever 29 is oscillated, the rack 22 will travel completely around the star wheel 21, thereby imparting a continuous movement to the shaft 11 in a given direction.

Agitators of any desired form may be used in connection with the above described device. In the drawings, an agitator especially adapted for use in beating eggs has been shown. This agitator comprises a vertically extended shaft 35 and a multiplicity of horizontally extended alternated bars 36 and 37. These agitator bars 36 and 37 are provided at their intermediate portions with hubs telescoped on to the lower end of the shaft 35 and held against removal therefrom by means of a nut 38 having screw threaded engagement with the projecting lower end of the shaft 35. By reference to Figs. 1 and 7, it will be noted that the hubs of the agitator bars 36 and 37 hold said bars spaced vertically one above the other. That portion of the shaft 35 which projects through the hub of the agitator bars 36 and 37 is longitudinally flattened on one side, as shown in Figs. 6, 8, and 9. The seats through the hubs of the agitator bar 36 are made to conform to the shape of the shaft 35 in cross section and thereby cause the bars 36 to rotate with the shaft 35. The seats through the hubs of the agitator bars 37 are made round, thereby leaving the bars 37 free to rotate on the shaft 35. By reference to Figs. 1 and 6, it will be noted that the ends of the agitator bars 36 are curved upward thereby making the agitator more efficient. As is evident, under the rotation of the shaft 35, which is secured to the driving shaft 11 by means of a coupling sleeve 38$^a$, the agitator bars 36 will rotate therewith and the agitator bars 37, being loose on the shaft 35, will be carried by the current, but owing to frictional engagement with the hubs of the agitator bars 37 and the shaft 35 will lag behind and thereby tend to retard the motion of the contents of the receptacle 2 which is being stirred. By thus retarding the contents of the receptacle, the agitator bars 36 will cut through the said contents and thereby thoroughly beat, mix, or stir the same.

Referring to the driving means, shown in Figs. 4 and 5, the numeral 39 indicates a large gear having located concentric therewith, a small gear 40. The gears 39 and 40 are provided with a short trunnion 41 having an annular groove 42. This trunnion 41 is identical with the trunnion 15 and is adapted to be seated in either of the seats 8$^a$ or 8$^b$ of the bearing 8 and is held against removal therefrom by the lever 16 in a manner previously described. When the trunnion 41 is mounted in the seat 8$^a$, the large gear 39 is in mesh with the pinion 12 and thereby drives the agitator at a relatively high speed. And when the trunnion 41 is seated in the seat 8$^b$, the small gear 40 is in mesh with the pinion 12 thereby driving the agitator at a relatively low speed. Secured to the gears 39 and 40, is an operating crank 43 for driving the shaft 11 in a continuous direction.

What I claim is:—

1. In a device of the kind described, the combination with a receptacle, of a standard, an upright shaft rotatively mounted on said standard and having a pinion secured thereto and provided with an agitator arranged to work in said receptacle, a gear mounted on said standard and meshing with said pinion, a star wheel carried by said gear, a pin tooth rack for driving said star wheel, a guide plate for said star wheel surrounding the teeth of said rack, and having one of its ends pivotally secured to said rack and having its other end adjustably secured thereto for swinging movement, the aperture in said guide plate permitting the removal of said star wheel therethrough, when said guide plate is moved to one extreme position, and a lever for operating said pin tooth rack, substantially as described.

2. In a device of the kind described, the combination with a depending driving shaft and a support therefor, of an agitator comprising a multiplicity of alternated loose and fixed flat bars horizontally disposed and intermediately mounted on said shaft, said bars being vertically spaced one above the other, and certain of said bars having their ends bent laterally to increase the efficiency of the agitator, substantially as described.

In testimony whereof I affix my signature in presence of two witnesses.

ADOLPH C. WESTBY.

Witnesses:
SAM K. MOORELAND,
KARL OLSEN EIDE.

Copies of this patent may be obtained for five cents each, by addressing the "Commissioner of Patents, Washington, D. C."